United States Patent
Yu

(12) 
(10) Patent No.: US 6,727,678 B2
(45) Date of Patent: Apr. 27, 2004

(54) RECHARGEABLE BATTERY PROTECTION CIRCUIT WITH ALARM UNIT

(75) Inventor: William Yu, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 10/172,559

(22) Filed: Jun. 13, 2002

(65) Prior Publication Data

US 2002/0195998 A1 Dec. 26, 2002

(30) Foreign Application Priority Data

Jun. 20, 2001 (TW) ........................................ 90114924 A

(51) Int. Cl.$^7$ .............................................. H01M 10/46
(52) U.S. Cl. ...................................... 320/134; 320/136
(58) Field of Search ................................ 320/134, 136, 320/132, 127, 160, 163

(56) References Cited

U.S. PATENT DOCUMENTS 5,184,109 A * 2/1993 Tanaka et al.

* cited by examiner

*Primary Examiner*—Edward H. Tso
(74) *Attorney, Agent, or Firm*—Fulbright & Jaworski LLP

(57) ABSTRACT

A rechargeable-battery protection circuit with alarm unit is proposed, which is designed for use with an electronic system with a rechargeable battery unit, such as a notebook computer with a lithium-type of rechargeable battery unit, for protecting the rechargeable battery unit against over voltage/current. The proposed rechargeable-battery protection circuit is characterized by the provision of an alarm unit which is capable of generating a human-perceivable alarm, such as an audible sound alarm, to alert the user to take necessary manual actions to protect the rechargeable battery unit against the over voltage/current when the built-in protective operation fails to work properly. This allows the rechargeable battery unit to be more reliably protected than the prior art.

6 Claims, 2 Drawing Sheets

RECHARGEABLE BATTERY PROTECTION CIRCUIT WITH ALARM UNIT

FIELD OF THE INVENTION

This invention relates to battery power management technology, and more particularly, to a rechargeable-battery protection circuit with an alarm unit for use on an electronic system with a rechargeable battery unit, such as a notebook computer with a lithium-type rechargeable battery unit, the circuit protecting the rechargeable battery unit against over voltage/current.

DESCRIPTION OF RELATED ART

There are two types of batteries: rechargeable and non-rechargeable. The non-rechargeable type is intended for one-time use and is discarded after the battery power is exhausted; whereas the rechargeable type can be repeatedly recharged after the battery power is exhausted. Portable electronic systems, such as notebook computers, are typically equipped with rechargeable batteries, such as the well-known lithium batteries, so that they can be repeatedly recharged for use while traveling.

The lithium-type rechargeable batteries have the benefits of having a larger capacity, being light weight, having an extended life, providing high output power, and having a fast recharge cycle. One drawback to the use of lithium-type rechargeable batteries, however, is that they are easily damaged by an over voltage/current condition; i.e., when a lithium-type rechargeable battery is subjected to an overly high recharging voltage exceeding 4.5 V (volt) or an overly low voltage below 2.2 V. Such over voltage/current conditions may cause permanent damage to the lithium-type rechargeable battery. Therefore, to protect the from this type of damage, a protection circuit is coupled to the lithium-type rechargeable battery.

FIG. 1 is a schematic block diagram showing the architecture of a conventional rechargeable-battery protection circuit. As shown, this rechargeable-battery protection circuit is designed for use with a rechargeable battery unit 100, such as a lithium-type rechargeable battery unit, for protecting the rechargeable battery unit 100 against over voltage/current during the recharging process. The architecture of this rechargeable-battery protection circuit includes an over voltage/current detection circuit 110, a microprocessor 120, and a recharging circuit 130.

The over voltage/current detection circuit 110 has a voltage/current input port A1 and a signal output port A2. The voltage/current input port A1 is coupled to receive the output voltage/current V/I of the rechargeable battery unit 100. The internal circuitry of the over voltage/current detection circuit 110 checks whether the output voltage/current V/I is over voltage/current or not. If YES, the over voltage/current detection circuit 110 will output an abnormal signal SI from its signal output port A2 to the microprocessor 120.

The microprocessor 120 has a signal input port B1 and a signal output port B2. The signal input port B1 is coupled to receive the abnormal signal S1 from the signal output port A2 of the over voltage/current detection circuit 110, and the signal output port B2 is used to output a recharge-disable signal S2 to the recharging circuit 130.

The recharging circuit 130 has a signal input port C1 and a voltage output port C2. The signal input port C1 is coupled to receive the recharge-disable signal S2 from the signal output port B2 of the microprocessor 120. The voltage output port C2 is coupled to the rechargeable battery unit 100 so that the recharging circuit 130 may recharge the rechargeable battery unit 100.

In the event of the rechargeable battery unit 100 having an over voltage/current condition, it will be promptly detected by the over voltage/current detection circuit 110. In response, the over voltage/current detection circuit 110 outputs an abnormal signal S1 to the microprocessor 120. The microprocessor 120 takes the abnormal signal S1 as an interrupt and promptly outputs a recharge-disable signal S2 to the recharging circuit 130. Upon receiving the recharge-disable signal S2, the recharging circuit 130 immediately stops the recharging process and uses DC-to-DC conversion technology to lower the charging voltage/current on the rechargeable battery unit 100 in order to protect the rechargeable battery unit 100 against over voltage/current damage.

One drawback to the rechargeable-battery protection circuit of FIG. 1, however, is that when the over voltage/current condition occurs the protection circuit may not always be able to stop the recharging process for one or more reasons including:

(1) the microprocessor 120 fails to receive the abnormal signal S1;

(2) the microprocessor 120 fails to output the recharge-disable signal S2 in response to the abnormal signal S1; or (3) the recharge-disable signal S2 fails to disable the recharging circuit 130 to stop the recharging process on the rechargeable battery unit 100.

Should any one of the above conditions happens, the recharging process will continue and eventually cause over voltage/current damage to the rechargeable battery unit 100. There exists, therefore, a need for a solution to this problem.

SUMMARY OF THE INVENTION

It is therefore an objective of this invention to provide a rechargeable-battery protection circuit with an alarm unit which can generate a human-perceivable alarm to alert the user to the over voltage/current condition. The user may then take the necessary actions to protect the rechargeable battery unit against over voltage/current damage.

In accordance with the foregoing and other objectives, the invention proposes a novel rechargeable-battery protection circuit with an alarm unit for use on an electronic system with a rechargeable battery unit. Such a circuit will help protect the rechargeable battery unit against over voltage/current damage.

The rechargeable-battery protection circuit of the invention comprises: (a) an over voltage/current detection circuit coupled to the rechargeable battery unit for detecting an over voltage/current condition from the rechargeable battery—if such a condition is detected, the detection circuit generates an abnormal signal and an alarm-enable signal; (b) a microprocessor, which is capable of generating a recharge-disable signal in response to the abnormal signal from the over voltage/current detection circuit; (c) a recharging circuit for performing a recharging process on the rechargeable battery unit, the recharging circuit being capable of stopping the recharging process in response to the recharge-disable signal generated by the microprocessor; and (d) an alarm unit, which is capable of generating a human-perceivable alarm in response to the alarm-enable signal generated by the over voltage/current detection circuit.

The rechargeable-battery protection circuit of the invention is characterized by the provision of the alarm unit, which is used to generate a human-perceivable alarm to alert the user to the over voltage/current condition. The user may then take the necessary manual actions to protect the rechargeable battery unit against over voltage/current damage. This allows the rechargeable battery unit to be more reliably protected than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The rechargeable-battery protection circuit with alarm unit according to the invention is disclosed in full details in the following description with reference to FIG. 2.

Figure 1:
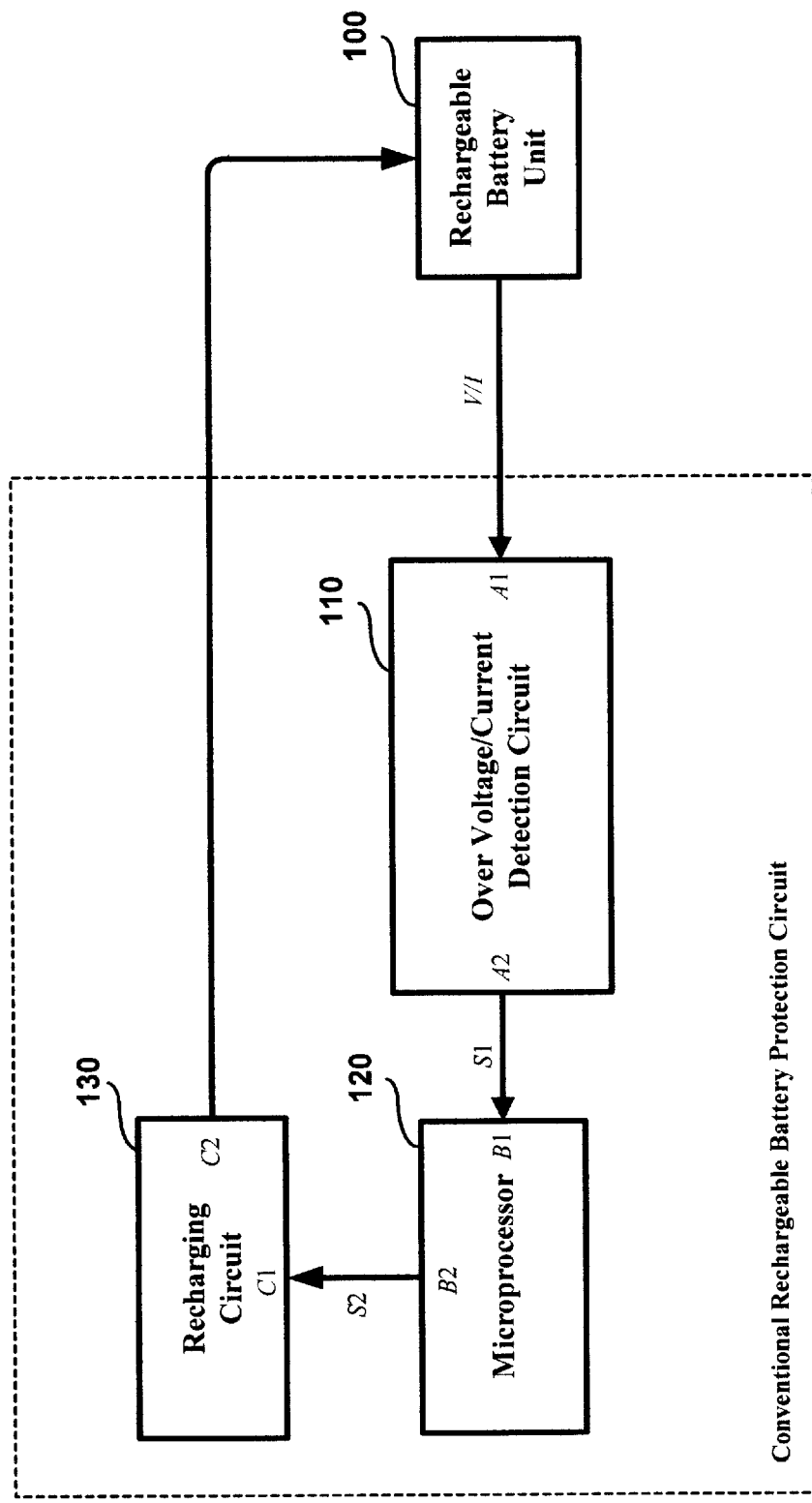
FIG. 1 (PRIOR ART) is a schematic block diagram showing the architecture of a conventional rechargeable-battery protection circuit.
Figure 2:
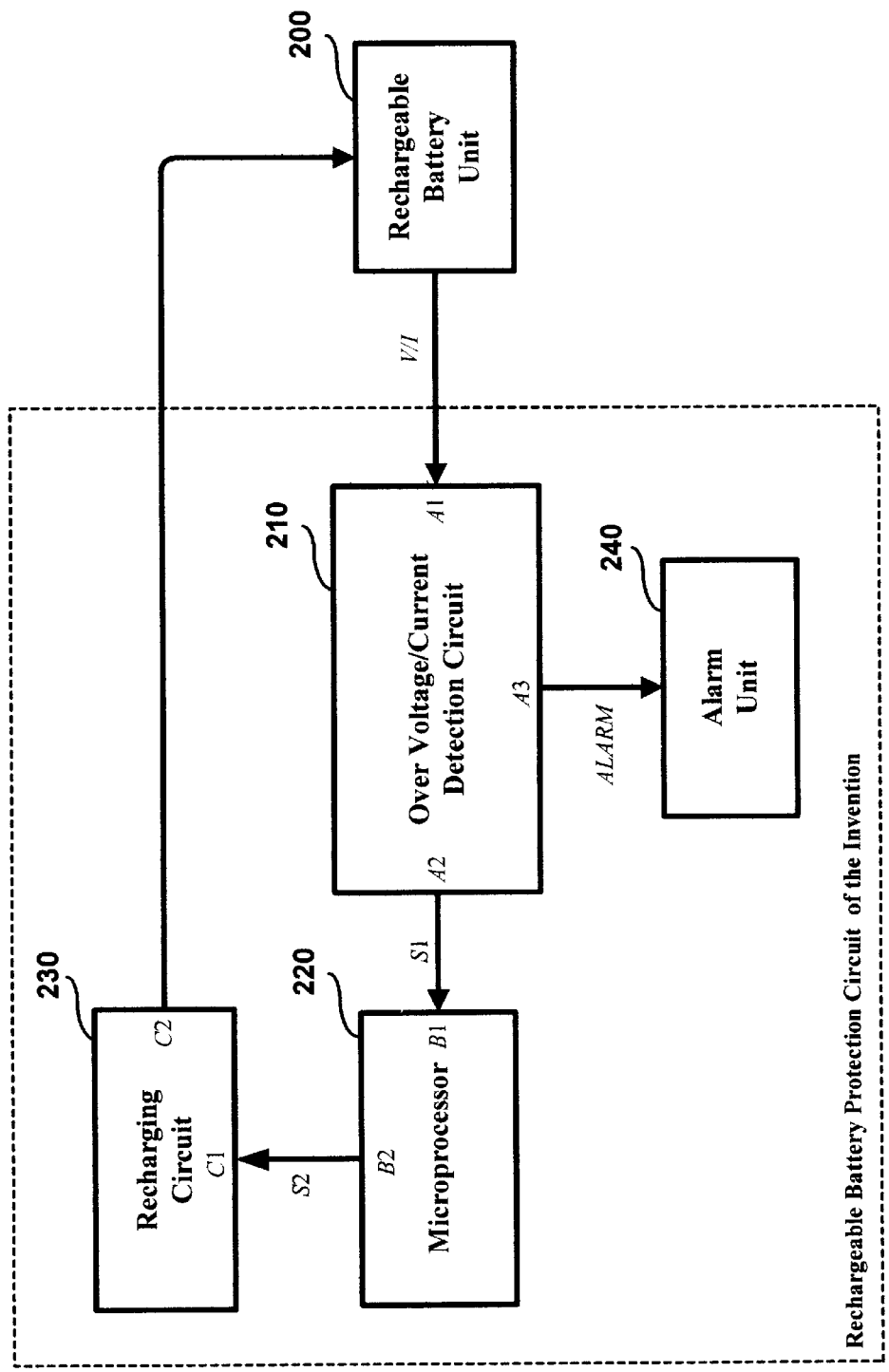
FIG. 2 is a schematic block diagram showing the architecture of the rechargeable-battery protection circuit according to the invention.

Referring to FIG. 2, the rechargeable-battery protection circuit of the invention is designed for use with a rechargeable battery unit 200, such as a lithium battery unit, to protect the rechargeable battery unit 200 against over voltage/current conditions during the recharging process. The architecture of the rechargeable-battery protection circuit of the invention comprises an over voltage/current detection circuit 210, a microprocessor 220, and a recharging circuit 230, and an alarm unit 240.

The over voltage/current detection circuit 210 has a voltage/current input port A1, a first signal output port A2, and a second signal output port A3. The voltage/current input port A1 is coupled to the output voltage/current V/I of the rechargeable battery unit 200. The internal circuitry of the over voltage/current detection circuit 210 checks whether the output voltage/current V/I is over voltage/current or not. If an over voltage/current condition occurs, the over voltage/current detection circuit 210 will output an abnormal signal S1 from its signal output port A2 and output an alarm-enable signal ALARM from its second signal output port A3. The abnormal signal S1 is output to the microprocessor 220, while the alarm-enable signal ALARM is output to the alarm unit 240.

The microprocessor 220 has a signal input port B1 and a signal output port B2. The signal input port B1 is used to receive the abnormal signal S1 from the signal output port A2 of the over voltage/current detection circuit 210, and the signal output port B2 is used to output a recharge-disable signal S2 to the recharging circuit 230 in response to the abnormal signal S1.

The recharging circuit 230 has a signal input port C1 and a voltage output port C2. The signal input port C1 receives the recharge-disable signal S2 from the signal output port B2 of the microprocessor 220. The voltage output port C2 is coupled to the rechargeable battery unit 200 so that the recharging circuit 230 may recharge the rechargeable battery unit 200.

In the event of the rechargeable battery unit 200 having an over voltage/current condition, it will be promptly detected by the over voltage/current detection circuit 210. In response, the over voltage/current detection circuit 210 promptly outputs an abnormal signal S1 from its signal output port A2 and outputs an alarm-enable signal ALARM signal from the second signal output port A3.

The abnormal signal S1 is transferred to the microprocessor 220, which takes it as an interrupt signal. The microprocessor 220 then promptly outputs a recharge-disable signal S2 from its signal output port B2 to the recharging circuit 230 in response, the recharging circuit 230 promptly stops the recharging process and uses DC-to-DC conversion technology to lower the charging voltage/current on the rechargeable battery unit 200 to protect the rechargeable battery unit 200 against over voltage/current damage.

If the foregoing operation fails, the alarm-enable signal ALARM transferred to the alarm unit 240 can trigger the alarm unit 240 to generate a human-perceivable alarm, such as an audible sound. The alarm alerts the user to take the necessary manual actions to stop the recharging process on the rechargeable battery unit 200, thereby protecting the rechargeable battery unit 200 against over voltage/current damage.

Compared to the prior art, the rechargeable-battery protection circuit of the invention is characterized by the provision of an alarm unit that can generate a human-perceivable alarm to alert the user to take the necessary manual actions to protect the rechargeable battery unit against over voltage/current damage. This allows the rechargeable battery unit to be more reliably protected than does the prior art. The invention therefore presents advantages over the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A rechargeable-battery protection circuit for use with a rechargeable battery unit for protecting the rechargeable battery unit against over voltage/current;

the rechargeable-battery protection circuit comprising:

(a) an over voltage/current detection circuit coupled to the rechargeable battery unit for detecting whether the rechargeable battery unit is under an over voltage/current condition; if yes, the over voltage/current detection generating an abnormal signal and an alarm-enable signal, and transferring the abnormal signal and the alarm-enable signal, respectively, to a microprocessor and an alarm unit coupled to the over voltage detection circuit;

b) the microprocessor being adapted to generate a recharge-disable signal in response to the abnormal signal from the over voltage/current detection circuit;

(c) a recharging circuit coupled to the microprocessor and to the rechargeable battery unit, the recharging circuit performing a recharging process on the rechargeable battery unit; the recharging process being capable of being stopped in response to the recharge-disable signal generated by the microprocessor, and the recharging circuit includes DC-to-DC conversion means for converting the over voltage/current magnitude to a lower voltage/current magnitude; and (d) the alarm unit being adapted to generate a human-perceivable alarm in response to the alarm-enable signal generated by the over voltage/current detection circuit.

2. The rechargeable-battery protection circuit of claim 1, wherein the rechargeable battery unit is a lithium type.

3. The rechargeable-battery protection circuit of claim 1, wherein the human-perceivable alarm is an audible sound alarm.

4. A rechargeable-battery protection circuit for use on a notebook computer with a rechargeable battery unit for protecting the rechargeable battery unit against over voltage/current;

the rechargeable-battery protection circuit comprising:
 (a) an over voltage/current detection circuit coupled to the rechargeable battery unit for detecting whether the rechargeable battery unit is under an over voltage/current condition; if yes, the over voltage/current detection generating an abnormal signal and an alarm-enable signal, and transferring the abnormal signal and the alarm-enable signal, respectively, to a microprocessor and an alarm unit coupled to the over voltage detection circuit;
 the microprocessor being adapted to generate a recharge-disable signal in response to the abnormal signal from the over voltage/current detection circuit;
 (c) a recharging circuit coupled to the microprocessor and to the rechargeable battery unit, the recharging circuit performing a recharging process on the rechargeable battery unit; the recharging process being capable of being stopped in response to the recharge-disable signal generated by the microprocessor, and the recharging circuit includes DC-to-DC conversion means for converting the over voltage/current magnitude to a lower voltage/current magnitude; and
 (d) the alarm unit being adapted to generate a human-perceivable alarm in response to the alarm-enable signal generated by the over voltage/current detection circuit.

5. The rechargeable-battery protection circuit of claim 4, wherein the rechargeable battery unit is a lithium type.

6. The rechargeable-battery protection circuit of claim 4, wherein the human-perceivable alarm is an audible sound alarm.

* * * * *